July 3, 1962

J. B. O'MARA 3,042,353

CABLE CLAMP

Filed Nov. 8, 1960

INVENTOR.
JOSEPH B. O'MARA
BY
V. F. Voek

HIS AGENT

July 3, 1962  
J. B. O'MARA  
CABLE CLAMP  
3,042,353
Filed Nov. 8, 1960
2 Sheets-Sheet 2
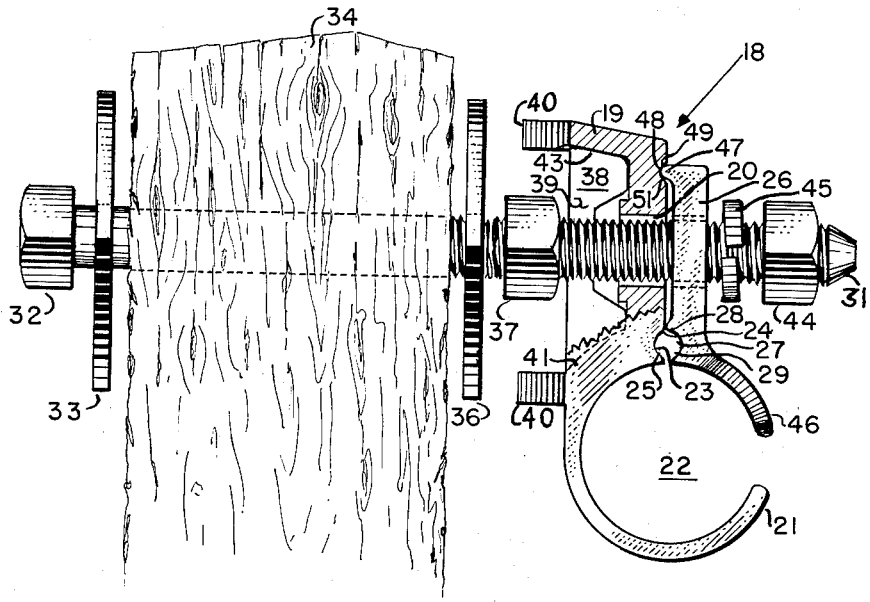
Fig. 3
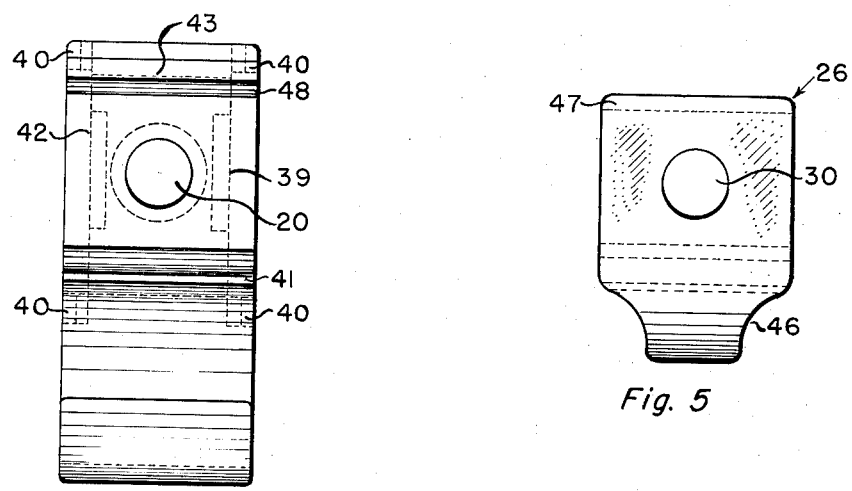
Fig. 4
Fig. 5
INVENTOR  
JOSEPH B. O'MARA  
BY  
*J. F. Volk*  
HIS AGENT

United States Patent Office 3,042,353
Patented July 3, 1962

3,042,353
CABLE CLAMP
Joseph B. O'Mara, Hastings on Hudson, N.Y., assignor to Anaconda Wire & Cable Company
Filed Nov. 8, 1960, Ser. No. 67,948
11 Claims. (Cl. 248—74)

My invention relates to a clamp for suspending an overhead cable and particularly to a cable clamp suitable for suspending a messenger supported cable of the type where the messenger and cable are closely connected throughout their length.

The clamp of my invention will fasten a cable messenger to the side of a pole by gripping the messenger from above and also provides a hook or extension under the clamp that will support the cable during the stringing operation and in the event that it should become detached from the support.

It is known in the electrical arts to manufacture cables such as but not limited to multiconductor telephone cables in a form where the cables are closely bound to a messenger at the factory, wound onto cable reels, and shipped to an installation site as a combined unit. Such factory connected cable-messenger combinations may be bound together by spiral wrappings of wire or tape and alternatively they may be connected by extruding a jacket such as a jacket of a plastic or rubber over both the cable core and the messenger simultaneously in such a manner that the cable is connected to the messenger by a short web of the jacketing material. When this latter construction is applied to telephone cable the combination of messenger and cable is known commercially as figure-8 cable.

In addition to messenger-cable combinations that are bound together in the factory it is also known to bind the cables to the messengers in the field either by clips or by spiral wires. When cable is connected to a messenger by means of clips the operation is usually accomplished by hand but when a cable is bound to a messenger by applying a spiral binding wire the operation is most commonly performed by means of a device known as a cable lasher. The lasher may be a complex apparatus, supported on the messenger and pulled forward by a tow line and having one or more spools mechanically driven by the forward motion to rotate around the messenger-cable combination and pay off binding wire in an open spiral around the two. Or more simply the lasher may consist of a tight coil of wire wound with a core diameter greater than the diameter of the cable and calculated to give the proper spiral lay around the messenger cable combination when the turns of the coil are spread apart.

The clamp of my invention affords a novel means of supporting a messenger attached to a cable in any of the aforementioned constructions although its usefulness is not limited thereto. It has however particular advantages for stringing figure-8 telephone cable as shall be more fully explained hereinafter. In many installations of telephone cables the latter are used as alternatives to, open telephone lines because, for one thing, messenger supported telephone cables can be strung in very long spans. Also, because they are very compact compared to open wires, messenger supported cables can frequently be strung on existing poles which are already carrying their full complement of open wires. Cross bars, which would be necessary for any considerable number of pairs of open telephone wire, are not required for figure-8 and other messenger supported cables which may be attached directly to the poles.

It will be apparent from the description that has been given of different types of messenger supported cables that except in the case of figure-8 cable it may be possible to insert a positive supporting member under the messenger and between the messenger and the cable for, even though the cable is bound closely to the messenger enough slack may be developed to permit the insertion of a flat supporting member. In the case of figure-8 cable, however, there is a solid web between the messenger and the cable so that no support can be inserted between them without cutting the web. Although this expedient of cutting the web has, at times, been resorted to, it is essentially an undesirable practice since the web of a figure-8 cable is the only means by which the cable is attached to the messenger and if the web is cut at the clamp, not only will the attachment be weakened at this point but tearing of the web may be initiated that will continue down the cable span. In order to understand the gravity of this problem for telephone cables it should be further explained that cables of the types described are particularly susceptible to wind-induced dancing or galloping. This phenomenon has most effect on cables that are subject to steady cross winds and consists of waves that travel down the cable spans and in severe cases may have amplitudes of many feet and be of a violence sufficient to tear the cables from their supports. Messenger supported cables of the type where the messenger is in close contact with the surface of the cable are now known to be more susceptible to dancing than other types because of the aerodynamics of the shape. It is believed that the smaller contour of the messenger causes turbulence that reduces the air pressure at the upper surface and causes the cable to lift. The phenomenon has been known to occur to lead sheathed and other heavy cables but is most troublesome for lightweight cables. Here the figure-8 cables are most affected since they are invariably light-weight-cables such as can be adequately suspended by the plastic web connecting them to the messenger.

My invention provides a clamp for a messenger supported cable which comprises a vertical base plate with a horizontal groove suitable for receiving a messenger. The base plate has an upwardly facing hook extending from it under the groove and has means for locking a messenger in the groove. In a preferred embodiment of my clamp a keeper having an outwardly extending tip is provided along with fastening means to lock the keeper to the base plate. The keeper which preferably has for this purpose a horizontal groove matching the groove in the base plate extends over the messenger and holds it in the groove. Once the cable has been installed, the lip on the keeper extends downwardly to confine the cable in the cable receiving area that is defined by the hook.

In a further preferred form of my invention the base plate is provided with an additional groove and the keeper, in addition to the lip, has a projection that will fit into one or both of the grooves thereby locking the keeper in either of two positions, one in which the lip is facing upwardly and the other in which the lip faces downwardly. A bolt may comprise the means of locking the keeper to the base plate.

A more thorough understanding of my invention will be gained from a consideration of the appended drawing.

In the drawing:

FIG. 3 is a side view of an embodiment of my invention.

FIG. 4 is a front view of an element of my invention.

FIG. 5 is a front view of a keeper used in my invention.

Figure 1:
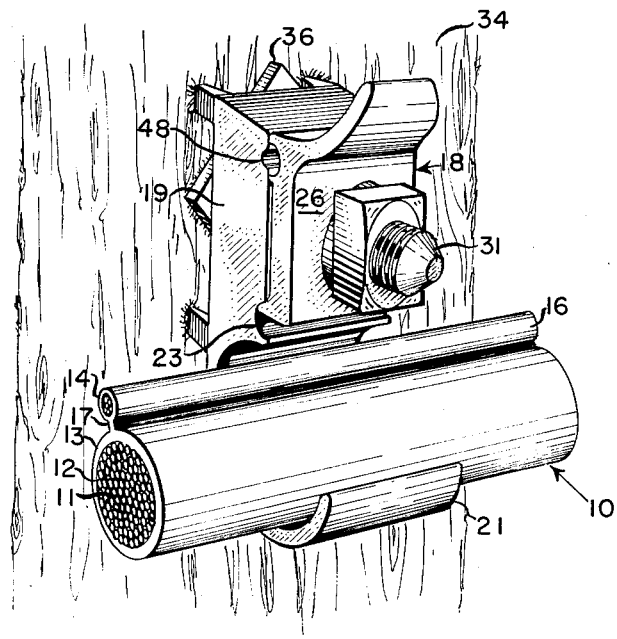
FIG. 1 is a perspective view of an embodiment of my invention with the clamp open.

In FIG. 1 a figure-8 cable 10 is comprised of a core 11 of insulated conductors 12 covered by a jacket 13 of a rubber or plastic material such as polyethylene. A messenger 14 of a high tensile material such as copper covered steel is covered by jacketing 16 which is an extension of the jacket 13 over the core. Integral with the jackets 13 and 16 is a web 17. The jackets 13 and 16 and the web 17 are most conveniently applied to the figure-8 cable simultaneously in a single extrusion operation. Although I have shown a figure-8 cable it will be readily understood that other types of cables wherein the messenger 14 is connected to the core 11 by means other than the web 17 may also be used with my invention.

Figure 2:
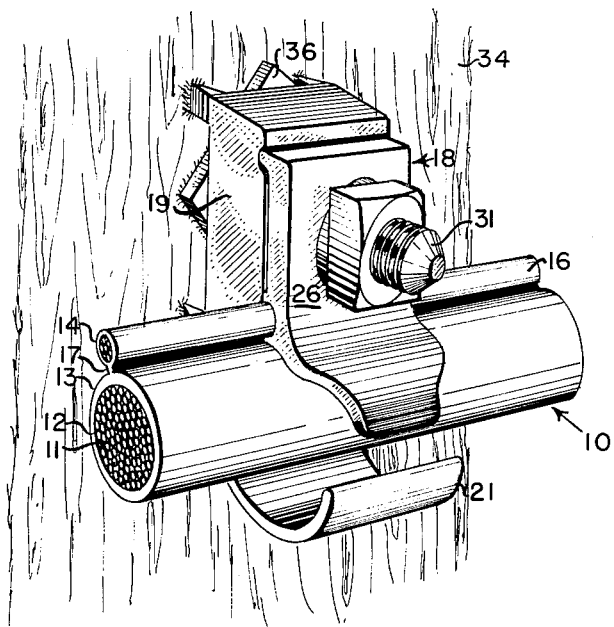
FIG. 2 is a perspective view of the embodiment of FIG. 1 with the clamp locked.

A clamp 18 is comprised of a base plate 19 pierced by a central bolt hole 20 (FIG. 3) and extending downwardly into a hook 21. The hook 21 defines an area 22 sufficient to encompass the cable 10. The base plate 19 has a horizontal groove 23 defined by walls 24, 25 capable of receiving (FIG. 2) the messenger 14 enclosed in its jacket 16. When the messenger 14 is fitted in the groove 23 it can be held in place by means of a keeper 26. The keeper 26 has a groove 27 defined by walls 28, 29 that overlays the groove 23 and helps to grip the messenger 14. The keeper 26 is pierced by a bolt hole 30 (FIG. 5) and a threaded bolt 31 having a bolt head 32 passes through a washer 33 and through a wooden pole 34 a washer 36, the base plate 19, and the keeper 26. The bolt 31 is threaded down to the washer 36 so that a nut 37 can be tightened to firmly attach the bolt 31, the washer 33, and the washer 36 to the pole 34. As best seen in FIGS. 3 and 4 the clamp 18 has a recess 38 defined by the walls 39, 41, 42, 43 which provides space for the nut 37. A nut 44 is applied over a lock washer 45 to tighten the keeper 26 against the back plate 19 locking the messenger 14 between the grooves 23 and 27. Extensions in the back plate 19 form four prongs 40 which are embedded into the pole 34 upon tightening of the nut 44. When the keeper 26 is locked against the base plate 19 with the messenger 16 held in the grooves 23, 27 a lip 46 extending from the keeper 26 closes the area 22 confining the cable 10 within the hook 21. Thus any failure of the clamp to grip the messenger 16 or any failure of the web 17 will not permit the core 11 to fall to the ground. The keeper 26 has a horizontal projection 47. This projection fits into an upper groove 48 defined by walls 49 and 51 (FIG. 3) in the base plate 19 when the keeper 26 is in its messenger locking position shown in FIGURE 2. When the keeper is locked in its open position as shown in FIGURE 1 the projection 47 fits into the groove 23. In either position the projection 47 thus serves to seat the keeper 26 and lock it against rotation.

When cable is installed employing the clamps of my invention holes are drilled in a line of poles that will be used for the cable run and a bolt 31 is inserted in each of the holes and through the washers 33 and 36. The nut 37 is threaded on the bolt 31 and tightened against the washer 36 for each pole in the line. A clamp 18 comprising the base plate 19 and keeper 26 is then placed on the bolt 31 by passing it through the bolt holes 20 and 30. The clamp is so placed that the hook 21 is lowermost and facing upwardly and the keeper 26 is placed with the lip 46 uppermost and the projection 47 fitted into the groove 23. The nut 44 is then threaded onto the bolt 31 until the prongs 40 are firmly imbedded into the pole 34. The cable 10 is then paid off a truck and laid on the ground along the line of poles. It will be understood that although my invention has special merit for use with figure-8 cable 10 shown in the drawing other types of messenger supported cable may also be used.

The keepers 26 all being in their unlocked or lip-uppermost position the hooks 21 are open and free to receive the cable 21 which is then raised and laid in the hooks. For installing figure-8 cable I recommend that the cable be raised on a limited number of poles (such as 3 or 4) at a time before tensioning. The nuts 44 are then loosened on those poles which have the cable 10 supported in the hooks 21 sufficiently to permit turning the keepers 26 so that the lips 46 are facing downward and the projections 47 are fitted into the grooves 48. While still under tension the messenger is then inserted between the grooves 23 and 27 the nut 44 is tightened against the keeper 26 with the lip 46 facing downwardly.

Where it is desired to lash the cables to the messengers in the field a long line extending for several miles can be tensioned at one time after the messengers have been placed in the hooks 21. The messengers are then clamped in the grooves 23, 27 and the cables are lashed thereto by any of several well known means.

I claim:

1. A clamp for a messenger supported cable comprising a vertical base plate, horizontal messenger receiving walls defining a groove in said base plate, a keeper having an outwardly extending lip, fastening means for locking said keeper to said base plate said keeper extending over and holding a messenger between said walls, an upwardly facing cable supporting hook extending from said base plate under said walls, said hook defining a cable receiving area, said lip extending downwardly to confine a cable in said cable receiving area.

2. The clamp of claim 1, wherein said fastening means comprises a bolt.

3. A clamp for a messenger supported cable comprising a vertical base plate, an upwardly facing cable supporting hook extending from said base plate, a keeper cooperating with said base plate for holding a messenger, said hook defining a cable receiving area, said keeper having an outwardly extending lip and said keeper locking in at least two positions, said lip extending downwardly in one of said positions to confine a cable in said receiving area and said lip in another of said positions permitting free access of a cable to and from said receiving area.

4. A clamp for a messenger supported cable comprising a vertical base plate, an upwardly facing cable supporting hook extending from said base plate, horizontal messenger receiving walls defining a groove in said base plate, a keeper having an outwardly extending lip, fastening means for locking said keeper to said base plate, said keeper having horizontal walls defining a groove cooperating with said messenger receiving groove to hold a messenger, said hook defining a cable receiving area, and said lip extending downwardly to confine a cable in said receiving area.

5. The clamp of claim 4 wherein said fastening means comprises a bolt.

6. A clamp for a messenger supported cable comprising a vertical base plate, an upwardly facing hook extending from said base plate, a first pair of horizontal walls defining a first groove in said base plate, a second pair of horizontal walls defining a second groove in said base plate, a keeper having an outwardly extending lip, walls defining a horizontal groove in said keeper, said groove in said keeper cooperating with said first groove to hold said messenger, a horizontal projection on said keeper, fastening means for locking said keeper to said base plate in a first position and in a second position, said projection fitting into said first groove said keeper being locked in said first position, and said projection fitting into said second groove said keeper being locked in said second position, said hook defining a cable receiving area, said lip extending downwardly to confine a cable in said receiving area said keeper being in said second position.

7. The clamp of claim 6 wherein said fastening means comprises a bolt.

8. A clamp for a messenger supported cable comprising a vertical base plate, an upwardly facing hook extending from said base plate, a first pair of horizontal walls defining a first groove in said base plate, a second pair of horizontal walls defining a second groove in said base plate, a keeper having an outwardly extending lip, horizontal walls defining a groove in said keeper, said groove in said keeper cooperating with said first groove to hold a messenger, a horizontal projection on said keeper, fastening means for locking said keeper to said base plate in a first position and in a second position, said projection fitting into said second groove said keeper being locked in said second position, said hook defining a cable receiving area, said lip extending downwardly to confine a cable in said receiving area said keeper being in said second position.

9. The clamp of claim 8 wherein said fastening means comprises a bolt.

10. A clamp for a messenger supported cable comprising a vertical base plate, horizontal messenger receiving walls defining a groove in said base plate, means for locking a messenger in said groove, an upwardly opening, cable-supporting hook extending from said base plate and providing an unobstructed plane between the midpoint of the opening of said hook and said messenger, whereby said hook will support said cable should said messenger be released from said groove.

11. A clamp for a messenger supported cable comprising a vertical base plate, an upwardly facing, cable-supporting hook extending from said base plate, messenger gripping means cooperating with said base plate above said hook and providing an unobstructed plane between the midpoint of the opening of said hook and said messenger whereby said hook will support said cable should said messenger be released from said gripping means.

References Cited in the file of this patent

UNITED STATES PATENTS

| | | |
|---|---|---|
| 776,695 | Ward et al. | Dec. 6, 1904 |
| 2,814,456 | Bartholomew | Nov. 26, 1957 |
| 2,948,940 | Degener | Aug. 16, 1960 |

FOREIGN PATENTS

| | | |
|---|---|---|
| 1,124,627 | France | July 2, 1956 |

Disclaimer

3,042,353.—*Joseph B. O'Mara*, Hastings-on-Hudson, N.Y. CABLE CLAMP. Patent dated July 3, 1962. Disclaimer filed Oct. 11, 1963, by the assignee, *Anaconda Wire and Cable Company*.
Hereby enters this disclaimer to claims 10 and 11 of said patent.
[*Official Gazette November 19, 1963.*]